United States Patent [19]

Ikeda et al.

[11] Patent Number: 4,817,053
[45] Date of Patent: Mar. 28, 1989

[54] APPARATUS FOR STORING AND RETRIEVING INFORMATION USING AN ELECTRON BEAM

[75] Inventors: Tadashi Ikeda, Kanagawa; Kazuo Shigematsu, Saitana; Yasushi Miyauchi, Tokyo; Motoyasu Terao, Tokyo; Tetsuya Nishida, Tokyo; Shinkichi Horigome, Tokyo; Norio Ohta, Sayama; Ryo Suzuki, Tokyo, all of Japan

[73] Assignee: Hitachi, Ltd., Tokyo, Japan

[21] Appl. No.: 71,309

[22] Filed: Jul. 9, 1987

[30] Foreign Application Priority Data

Jul. 11, 1986 [JP] Japan .................. 61-161838

[51] Int. Cl.$^4$ ............................................. G11C 13/00
[52] U.S. Cl. ........................... 365/113; 365/118; 365/128; 369/13; 250/213 R
[58] Field of Search ............ 365/118, 128, 217, 113, 365/237; 369/13; 346/158; 250/213 R; 313/507

[56] References Cited

U.S. PATENT DOCUMENTS

| | | | |
|---|---|---|---|
| 3,530,441 | 9/1970 | Ovshinsky | 365/118 |
| 3,949,387 | 4/1976 | Chaudhari et al. | 365/128 |
| 3,961,314 | 6/1976 | Klose et al. | 365/113 |
| 4,001,493 | 1/1977 | Cone | 346/158 |
| 4,534,016 | 8/1985 | Kirkpatrick et al. | 365/217 |
| 4,725,736 | 2/1988 | Crewe | 365/118 |

FOREIGN PATENT DOCUMENTS

| | | | |
|---|---|---|---|
| 0139474 | 5/1984 | European Pat. Off. | 365/113 |
| 0158804 | 10/1985 | European Pat. Off. | 365/113 |
| 1486271 | 9/1977 | United Kingdom | 365/113 |

OTHER PUBLICATIONS

IBM Tech. Discl. Bull., vol. 16, No. 3, Aug. 73, p. 869 "Electron-Beam Addressable Memory By Solid-State Transformation" by Chaudhari et al.
IBM Tech. Discl. Bull., vol. 16, No. 1, Jun. 1973, pp. 108-109, "Structures for Reversible SmS Optical Systems" by von Gutfeld.

*Primary Examiner*—Stuart N. Hecker
*Assistant Examiner*—Alfonso Garcia
*Attorney, Agent, or Firm*—Antonelli, Terry & Wands

[57] ABSTRACT

An electron beam memory system in which a phase transition type recording film is used as an information recording medium, and for recording information, a focused electron beam is selectively projected on desired positions of the recording film so as to locally heat the recording film and cause phase transition, while for retrieving information, an electron beam having energy at a degree not causing the phase transition is projected so as to utilize the fact that reflection or diffraction of the primary electron beam projected at the retrieval differs between the recorded regions and unrecorded regions.

23 Claims, 1 Drawing Sheet

APPARATUS FOR STORING AND RETRIEVING INFORMATION USING AN ELECTRON BEAM

BACKGROUND OF THE INVENTION

1. Field of the Invention

The present invention relates to a system for recording and retrieving information. More particularly, it relates to an electron beam memory system of the phase transition type wherein the phase transition of a recording medium is effected with an electron beam and wherein the state of the phase transition is detected with an electron beam.

2. Description of the Related Art

As systems for recording and retrieving digital information, there have been known a magnetic disc system, an optical disc system, etc. Any of these systems performs recording and retrieval in such a way that a physical or chemical change is caused in a recording medium by the use of a magnetic flux signal or an optical signal, and that the presence and absence of the physical or chemical change correspond to digital information items "1" and "0."

A system utilizing the phase transition of a recording medium as the physical or chemical change thereof is disclosed in U. S. Pat. No. 3,530,441. This system is such that atoms in the recording medium are moved by heating with a laser beam, so as to generate local phase transition states in the recording medium. However, in case of recording information by the use of light in this manner, the smallest light beam spot which can be converged is of approximately 1 $\mu$m in diameter because of the limit of the wavelength of the light, and the limit of the recording density of the system has been $10^8$ bits/cm$^2$.

Meanwhile, an electron beam recording and retrieving method wherein information is recorded and retrieved by employing an electron beam instead of the laser beam is disclosed in the official gazette of Japanese Patent Application Laid-open No. 62845/1983. This method is such that a recording medium which comprises a substrate, a chalcogenide thin film (Se-Ge-based thin film) disposed on the substrate, and an Ag thin film formed on the chalcogenide thin film, is irradiated with the electron beam so as to diffuse Ag into the chalcogenide thin film on the basis of the electron beam exposure, thereby to record information, while the difference between the secondary electron emissivities of exposed parts and unexposed parts is sensed, thereby to read the information. Since, however, the Ag thin film disposed on the chalcogenide thin film has the disadvantage of liability to oxidation in the atmospheric air, the method involves the problem that the retrieval efficiency of information lowers due to the oxidation of the surface of the Ag thin film. Another problem is that, since information is recorded by exploiting the diffusion of Ag into the chalcogenide thin film as based on the electron beam exposure, it cannot be rewritten.

SUMMARY OF THE INVENTION

An object of the present invention is to provide an electron beam memory system which can record high-density information at a recording density of or above $10^8$ bits/cm$^2$.

Another object of the present invention is to provide an electron beam memory system which is non-volatile and rewritable.

Still another object of the present invention is to greatly increase the retrieval efficiency of an electron beam memory system.

According to the present invention, the diameter of an electron beam is set at or below 1 $\mu$m, more preferably at or below 0.5 $\mu$m, and a phase transition type recording film is locally irradiated with the electron beam which is pulsed or whose intensity is changed, whereby the thin film is locally heated and subjected to phase transition so as to write or erase information. Phase transition regions of submicron diameter written by this operation can be read out at high speed and at high efficiency. Further, according to the present invention, information is read out by directly sensing or detecting the reflection or diffraction of primary electrons, not secondary electrons emitted by the electron beam irradiation. The reason therefor is as follows: The energy of the secondary electrons emitted from the phase transition film amounts to at most several % of that of the primary electrons in many cases though this depends also upon the material of the film. Especially a primary electron beam for retrieval must be weakened to the extent of affording no damage to the recording medium, so that the energy of the secondary electrons for detection becomes still feebler. It is therefore very difficult to detect a difference based on the phase transition.

Besides, the surface of the phase transition type recording film being the recording medium is sometimes formed with a protective film for avoiding the deformation of the medium attendant upon the phase transition. In this case, the secondary electrons from the recording medium scatter also in the protective film portion. Especially in the case of disposing the protective film, therefore, it is next to impossible to detect the phase transition regions beyond the protective film.

For these reasons, with note taken of back scattering for the incident primary electron beam, the inventors studied the read-out of information from the phase transition material beyond the protective film. As a result, it has been found out that the amounts of detection of reflected electrons are clearly different between an amorphous phase where information is written and a crystalline phase where information is not written, and that the detection amounts of the reflected electrons conspicuously change particularly at the boundary part between the phases. Thus, information read-out of high signal-to-noise ratio has been realized by utilizing the property that, unlike those of the secondary electrons based on incident electrons, the detection amounts of the reflected electrons (or absorbed electrons) are greatly different between the information written part and the unwritten part. Since the read-out efficiency has increased, it has become possible to sharply shorten a period of time required for the detection and to remarkably raise a read-out speed. That is, owing to the detection of the reflected electrons, the read-out of high efficiency and high speed has been permitted, and further, the detection through the protective film of SiO$_2$ or the like has been permitted, so that the aforementioned objects can be accomplished.

The above-stated phase transition information retrieval method which exploits the reflection or diffraction of the irradiating electron beam operates so as to increase a detection output much more than in the case of exploiting the secondary electron beam. As a result, the signal-to-noise ratio (S/N ratio) is greatly improved in a memory which adopts the retrieval method. Since the detection sensitivity is sharply enhanced, the period of time required for reading one information item is shortened much. Therefore, even when the rotational speed of a disc is increased to read out information at high speed, no malfunction occurs. Besides, a protective film is usually required for a phase transition type recording film in order to avoid the deformation thereof in the operation of rewriting recording. With the secondary electron read-out, the detection beyond the protective film has been difficult because of the low energy of the emitted electrons. In contrast, with the retrieval method of the invention, the reflected electrons the energy level of which is as high as that of the incident electrons, and hence, the read-out beyond the protective film is possible, so that the practicability of this method is high. By the way, when the protective film on the side of electron beam incidence is too thin, it does not have the effect of checking the deformation, whereas when it is too thick, the S/N ratio of read-out becomes low. The appropriate thickness of the protective film depends closely upon the material thereof. For example, in case of employing $SiO_2$, the thickness of the protective film should preferably be 30 nm to 200 nm inclusive.

DETAILED DESCRIPTION OF THE PREFERRED EMBODIMENT

Now, one embodiment of the present invention will be described with reference to FIGS. 1 and 2.

Figure 1:
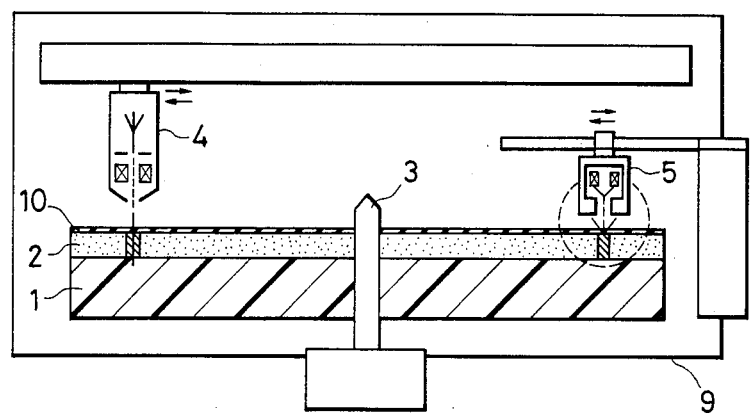
FIG. 1 is a view schematically showing an electron beam memory system which is an embodiment of the present invention.
Figure 2:
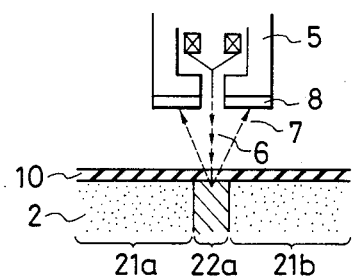
FIG. 2 is an expanded view of a retrieval electron gun in FIG. 1.

FIG. 1 is a schematic view of the electron beam memory system of the present invention, while FIG. 2 is an expanded view of a retrieval electron gun 5. A recording material 2 formed on a disc-shaped substrate 1 is made of In-Se-Tl, and it is a phase transition material film having a thickness of 120 nm. This film 2 is sandwiched between $SiO_2$ protective films 10 which are 150 nm thick on the substrate side and 80 nm thick on the front surface side of the film (the protective film on the substrate side is not shown). The disc substrate 1 is fixed to a cylinder 3, and can rotate at 1000-4000 r. p. m. Electron guns 4 and 5 which are recording and retrieval heads, respectively, are installed over the disc substrate 1. Of course, a single electron gun serving for both recording and retrieval is sometimes installed, but the case of employing the dedicated heads will be explained here. The recording electron gun 4 is about 2 mm spaced from the surface of the disc 1, and is adapted to generate an electron current of 1 μA under an acceleration voltage of 3 kV. The diameter of an electron beam from this gun 4 is focused to 0.3 μm.

The recording film 2 is rendered crystalline before the irradiation thereof with the electron beam. However, it has the property that, when the temperature of an irradiated part is raised up to approximately 700° C. and the electron current is rapidly decreased, the irradiated part is quenched to undergo phase transition into an amorphous phase. In addition, although the In-Se-Tl film is covered with the $SiO_2$ being 80 nm thick, the electron current satisfactorily reaches the front surface of the recording film 2. The recording film heated by the electron current reaching the film surface turns into the desired amorphous phase, whereby information is written. On the other hand, the erasure of information is achieved in such a way that the recording film 2 in which the information has been written has its temperature raised to 500° C. so as to be restored into the crystalline state. The temperature rise on this occasion is carried out by continuously projecting an electron beam. "Overwrite" (in which rewrite is realized merely by recording without an erasing operation) is also possible when the recording film is irradiated with an electron current which is intensity-modulated between an electron current intensity bringing the surface temperature of the recording film 2 to approximately 500° C. and an electron current intensity bringing it to approximately 700° C.

The characterizing feature of this system consists in the retrieval of recorded information. The head dedicated to the retrieval 5, over the disc substrate 1, is lighter in weight than the recording head 4, and is easier of moving. This retrieval electron gun 5 is used in the state in which it is brought close to the disc substrate up to a spacing of approximately 2 μm. The retrieval electron gun 5 is adapted to emit an electron beam having an electron current of 40 nA and a beam diameter of 0.2 μm under an acceleration voltage of 500V. The reflected electrons 7 of the electron current 6 emitted from the retrieval electron gun 5 are detected by a channel plate 8 (electron multiplier) which is disposed around this electron gun 5. Here, the reflected electrons whose detection sensitivity differs greatly in accordance with the presence or absence of the phase transition unlike secondary electrons are detected, so that the information can be detected through the protective film 10, and the signal-to-noise ratio of the detection is favorable. Moreover, owing to the retrieval head 5 which is sufficiently lighter than the recording head 4, the information can be read out at a high speed of 3000-5000 r. p. m.

Figure 3:
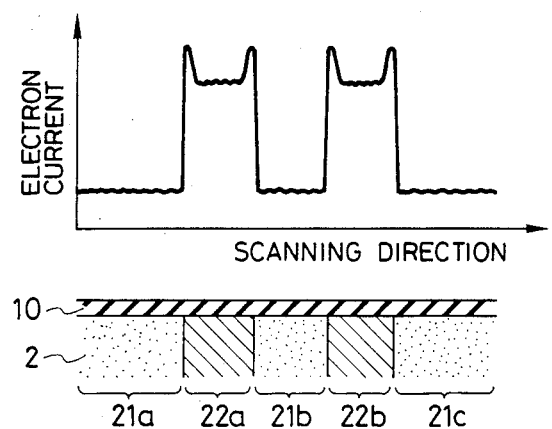
FIG. 3 is a diagram showing the state of reflected electron currents.

FIG. 3 is a diagram showing the state of reflected electron currents. As apparent from the diagram, the amounts of the reflected electrons differ depending upon the crystalline phase (at 21a, 21b and 21c) and the amorphous phase (at 22a and 22b), but the reflection amount is often larger in the vicinity of the boundary between the phases, than in any of the phases. There is also a case where the reflection amount becomes smaller contrariwise. Anyway, the presence or absence of the phase transition can be readily detected near the boundary of the phases. Accordingly, the present invention adopts a recording method in which the position of the phase boundary corresponds to information, thereby to realize a recording density which is about twice as high as the density of a conventional method (a method in which the central position of a phase corresponds to information). Incidentally, those parts of the disc substrate, the electron gun heads and the detector in the present embodiment through which the electrons pass are held in a vacuum vessel 9.

Although the erasable electron beam memory has been described in detail here, it is needless to say that the present invention is also applicable to a read-only memory (ROM), a write-once memory and an add-on memory without any modification.

In the above description, the phase transition has been caused between the crystalline phase and the amorphous phase. However, it may well be caused between a first crystalline phase and a second crystalline phase or between a first amorphous phase and a second amorphous phase.

We claim:

1. An apparatus for storing and retrieving information using an electron beam, comprising:
   a solid phase transition recording medium which is disposed on a disc-shaped substrate, solid phase transition of said recording medium occurring in accordance with an amount of irradiation with an electron beam, said solid phase transition of said recording medium occurring between a first solid phase and a second solid phase;
   a recording electron gun which emits said electron beam, and which irradiates said recording medium with said electron beam at a level corresponding to information and causes the solid phase transition of said recording medium so as to cause the information to be recorded into said recording medium;
   a retrieval electron gun which emits an incident electron beam of primary electrons so as to irradiate said recording medium with the incident electron beam, the incident electron beam being at a level not causing the solid phase transition in said recording medium, said retrieval electron gun being adapted to permit information to be read out of said recording medium;
   means for reading out the information recorded in said recording medium, in such a way that a state of the solid phase transition of said recording medium is detected on the basis of an amount of reflected primary electrons of said incident electron beam from a surface of said recording medium;
   means for rotating said disc-shaped substrate; and
   means for moving said recording electron gun, the retrieval electron gun and the means for reading out the information.

2. An apparatus for storing and retrieving information using an electron beam according to claim 1, wherein a protective film for avoiding deformation of the recording medium upon the solid phase transition is provided on said recording medium, the detection of the state of the phase transition being performed on the basis of the amount of reflected primary electrons from a surface of the recording medium through the protective film.

3. An apparatus for storing and retrieving information using an electron beam according to claim 2, wherein said protective film is made or $SiO_2$.

4. An apparatus for storing and retrieving information using an electron beam according to claim 3, wherein said protective film has a thickness of 30 nm to 200 nm inclusive.

5. An apparatus for storing and retrieving information using an electron beam according to claim 1, wherein said recording electron gun is spaced about 2 mm from the surface of said recording medium, and said retrieval electron gun as well as the means for reading out the information is spaced about 2 $\mu$m from the recording medium surface.

6. An apparatus for storing and retrieving information using an electron beam according to claim 1, wherein said means for reading out the information is an electron multiplier which is arranged around said retrieval electron gun.

7. An apparatus for storing and retrieving information using an electron beam according to claim 1, wherein said means for reading out the information is a channel plate which is arranged around said retrieval electron gun.

8. An electron beam memory system according to claim 1, wherein the rotation means rotates at a speed of 3000–5000 r. p. m.

9. An apparatus for storing and retrieving information using an electron beam according to claim 1, wherein the first solid phase is an amorphous phase and the second solid phase is a crystalline phase.

10. An apparatus for storing and retrieving information using an electron beam according to claim 1, wherein said recording electron gun emits an electron beam of sufficient energy so as to locally heat the recording medium and cause the solid phase transition between the first solid phase and the second solid phase.

11. An apparatus for storing and retrieving information using an electron beam according to claim 1, wherein the recording electron gun emits an electron beam having a diameter of at most 1.0 $\mu$m.

12. An apparatus for storing and retrieving information using an electron beam according to claim 11, wherein the recording electron gun emits an electron beam having a diameter of at most 0.5 $\mu$m.

13. An apparatus for storing and retrieving information using an electron beam, comprising:
   a solid phase transition recording medium which is disposed on a disc-shaped substrate, the solid phase transition of said recording medium corresponding to the information;
   means for recording information in said recording medium, the information recording means emitting an electron beam which irradiates said recording medium at a level corresponding to the information and which causes the solid phase transition of said recording medium;
   means for reading out the information recorded in said recording medium, the means for reading out the information including a means for emitting an incident electron beam and irradiating said recording medium with said incident electron beam, said incident electron beam being at an energy level that does not cause the solid phase transition in the recording medium, and means for detecting a state of the solid phase transition of said recording medium on the axis of an amount of reflected primary electrons of said incident electron beam from said recording medium;
   means for rotating disc-shaped substrate; and
   means for moving said means for recording information, said means for emitting an incident electron beam, and said means for detecting.

14. An apparatus for storing and retrieving information using an electron beam according to claim 13, wherein a protective film for avoiding deformation of said recording medium upon the phase transition is provided on said recording medium, the means for detecting acting to detect the amount of reflected primary electrons from the surface of the recording medium through the protective film.

15. An apparatus for storing and retrieving information using an electron beam according to claim 14, wherein said protective film is made of $SiO_2$.

16. An apparatus for storing and retrieving information using an electron beam according to claim 15, wherein said protective film has a thickness of 30 nm to 200 nm inclusive.

17. An apparatus for storing and retrieving information using an electron beam according to claim 13, wherein said means for emitting an incident electron beam and the means for detecting are each spaced about 2 μm from the surface of said recording medium.

18. An apparatus for storing and retrieving information using an electron beam according to claim 13, wherein said means for detecting is an electron multiplier which is arranged around said means for emitting an incident electron beam.

19. An apparatus for storing and retrieving information using an electron beam according to claim 13, wherein said means for detecting is a channel plate which is arranged around said means for emitting an incident electron beam.

20. An apparatus for storing and retrieving information using an electron beam according to claim 13, wherein the rotation means is rotated at a speed of 3000–5000 r. p. m.

21. An electron beam retrieval system according to claim 13, wherein the phase transition of said recording medium occurs between an amorphous phase and a crystalline phase.

22. An apparatus for storing and retrieving information using an electron beam according to claim 13 wherein said information recording means emits an electron beam of sufficient energy to locally heat the recording medium and cause the solid phase transition.

23. An apparatus for storing and retrieving information using an electron beam, comprising a solid phase transition recording film used as an information recording medium; means for providing a focused electron beam, wherein, for recording information, the focused electron beam is selectively projected on desired positions of the recording film so as to locally heat the recording film and cause solid phase transition, to provide recorded regions and unrecorded regions; means for providing an incident electron beam for retrieving information, wherein an electron beam having energy at a degree not causing the solid phase transition is projected; and detecting means for retrieving the information by detecting a difference in the reflection of primary electrons of the incident electron beam projected at the retrieval between the recorded regions and unrecorded regions.

* * * * *